United States Patent [19]

Usui

[11] Patent Number: 5,351,079
[45] Date of Patent: Sep. 27, 1994

[54] COLOR BALANCE ADJUSTING APPARATUS USING A DECORRELATING NEURAL NETWORK

[75] Inventor: Shiro Usui, Takashijyutaku #5-504, 2-1, Higashiura, Kitayama-chou, Toyohasi, Aichi, 441, Japan

[73] Assignees: Shiro Usui, Aichi; Toyo Ink Manufacturing Co., Ltd., Tokyo, both of Japan

[21] Appl. No.: 977,598

[22] Filed: Nov. 17, 1992

[30] Foreign Application Priority Data

Nov. 21, 1991 [JP] Japan .................. 3-305940

[51] Int. Cl.$^5$ ............................................. H04N 9/73
[52] U.S. Cl. .................... 348/223; 348/655; 395/22
[58] Field of Search .......... 358/29, 504, 518; 395/22, 131; 348/223, 655; H04N 9/73

[56] References Cited

U.S. PATENT DOCUMENTS

| | | | |
|---|---|---|---|
| 4,985,853 | 1/1991 | Taylor et al. | 395/131 |
| 5,025,282 | 6/1991 | Nakamura | 395/22 |
| 5,052,043 | 9/1991 | Gaborski | 395/22 |
| 5,162,899 | 11/1992 | Naka et al. | 395/22 |
| 5,185,850 | 2/1993 | Usui et al. | 395/22 |

OTHER PUBLICATIONS

Lippmann, Richard P., "An Introduction To Computing With Neural Nets," IEEE ASSP Magazine, Apr. 1987, pp. 4–22.

Barlow, H. et al. "Adaptation and Decorrelation . . . ". The Computing Neuron, Wesley, England (1989) pp. 54–72.

Palmieri, F. et al., "Linear Neural . . . ", Proc. IJCNN, Seattle, (1991) pp. 791–796.

Judd, D. B., et al. "Spectral Distribution . . . ". Journal of the Optical Soc. of Am. vol. 54, No. 8, 1964.

Orfanidis, S. J., "Gram-Schmidt Neural Nets". Neural Computation, vol. 2 (1990).

Barlow, H. B. "Unsupervised Learning". Neuro Computing, vol. 1.

Wyszecki, G. et al. "Color Science", John Wiley & Sons (1982) pp. 614–617.

Arend, L. E. et al. "Simultaneous Color . . . ", J. Opt. Soc. Am. A, vol. 8, No. 4, (1991) pp. 661–672.

Primary Examiner—Mark R. Powell
Assistant Examiner—John W. Miller
Attorney, Agent, or Firm—Ladas & Parry

[57] ABSTRACT

A color balance adjusting apparatus for adjusting color imbalance due to the difference in color temperature between a preferable standard illuminant and an illuminant under which a color image is obtained, thereby making the colors of the image substantially identical to those obtained under the preferable standard illuminant. This apparatus comprises a decorrelating neural network for receiving three color component signals correlating with one another and indicative of an image, and minimizing the correlation thereamong, the network having learned so as to minimize the correlation among signals indicative of an image obtained under an illuminant, and a converter for mapping the output of the decorrelating means, into a space of the input image signals, with the use of the inverse matrix of a transfer matrix of the neural network having learned under the preferable standard illuminant. The output of the converter is generated as a signal obtained after white balance adjusting.

18 Claims, 17 Drawing Sheets

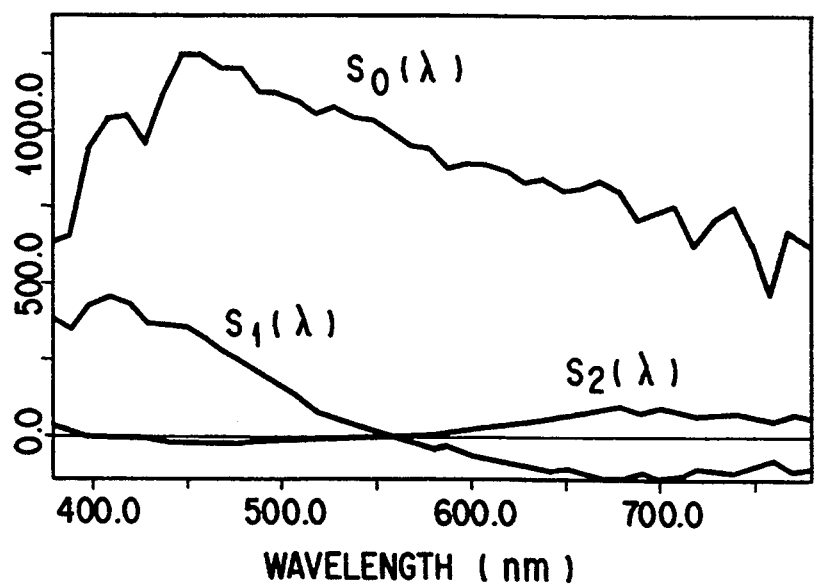
F I G. 4
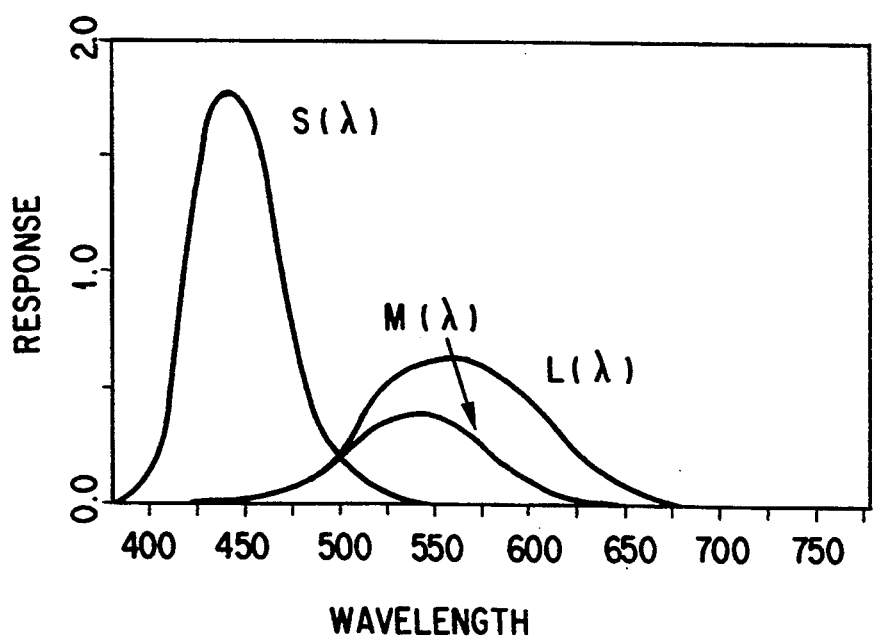
F I G. 5

6774[K]

10000[K]

2850[K]

6774[K]

10000[K]

2850[K]

6774[K]

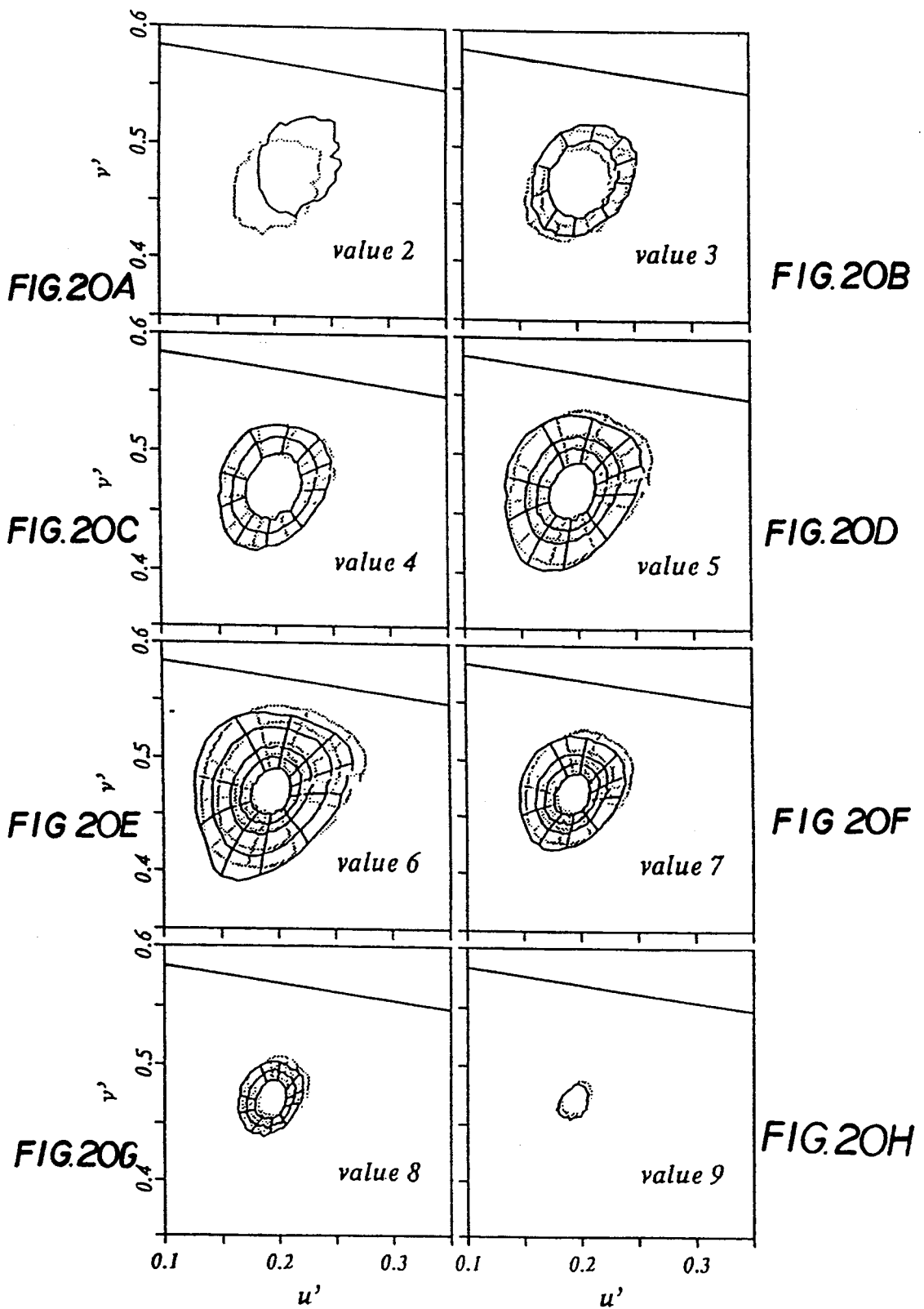
6774[k]-2850[k]
FIG.20A value 2
FIG.20B value 3
FIG.20C value 4
FIG.20D value 5
FIG.20E value 6
FIG.20F value 7
FIG.20G value 8
FIG.20H value 9

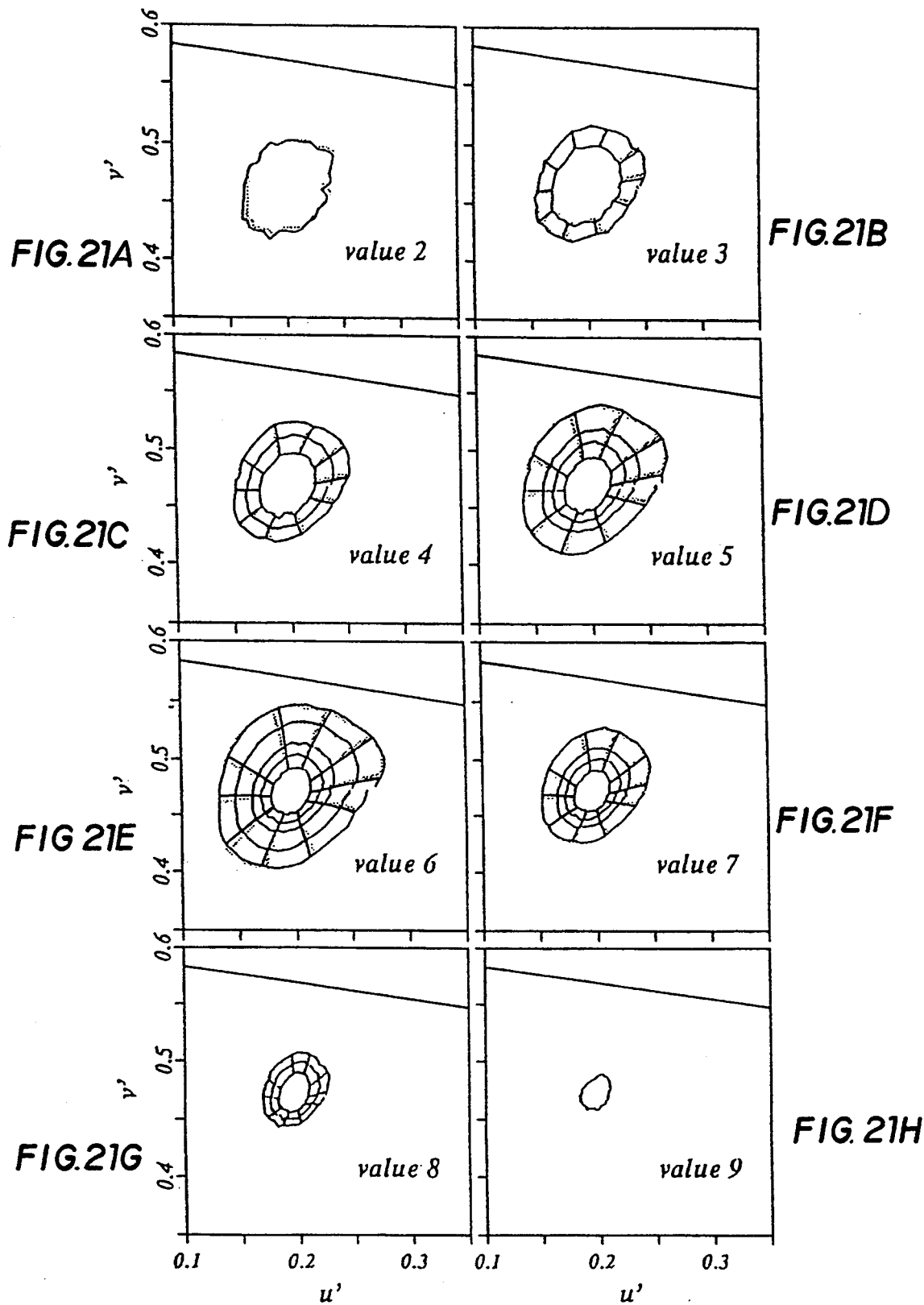

COLOR BALANCE ADJUSTING APPARATUS USING A DECORRELATING NEURAL NETWORK

BACKGROUND OF THE INVENTION

1. Field of the Invention

The present invention relates to a color balance adjusting apparatus for adjusting color balance, especially white balance, which is for use in an imaging apparatus using a color image signal, such as a color video camera and a color television camera, and also to a method for adjusting the color balance.

2. Description of the Related Art

Conventionally, there are external and internal photometry methods for automatically adjusting the white balance of a color image.

In the external photometry method, the color temperature of an illuminant for illuminating an object is measured by an external sensor, and the gains of image signals indicative of red and blue components are adjusted so that the ratio among red, green, and blue could become 1:1:1 in accordance with the difference between the measured color temperature and the color temperature of a standard illuminant.

In the internal photometry method, a color difference signal is used as color temperature data. The color difference signals R-Y and B-Y are integrated (averaged), and the gains of the red and blue component signals are controlled so that the integration results could be 0. In other words, under the assumption that the average value of so many pixels in the color image, in many cases, an achromatic color when the white balance is adjusted, the red and blue signals are adjusted so that the ratio of the integration results of the red, green, and blue signals could become 1:1:1.

However, in the external photometry method, if an illumination illuminating the entire scene including an object differs from light actually measured, specifically, if a bright outdoor object is imaged from the inside of a dark room, the white balance of the object may be adjusted on the basis of a color temperature differing from the actual one, since the color temperature of the illuminant used in the dark room is actually measured. As a result, a very unnaturally-colored image may be obtained.

On the other hand, in the internal photometry method, a problem will occur where the above-described assumption is not applicable. Integration of the entire image of an object with its background, such as a blue sky and a blue sea or of a red wall, provides a value indicating blue or red but not indicating an achromatic color. Therefore, if white balance adjustment is made to the object by means of the internal photometry method, the colors of the background may fade, or the colors of the object (man, etc.) may be wrongly adjusted to become their complementary colors, providing an unnatural color tone.

As described above, in the conventional color balance adjustment, it is difficult to make correct color adjustment to all kinds of images.

SUMMARY OF THE INVENTION

The present invention has been made to solve the above problem, and its object is to provide a very reliable color balance adjusting method and apparatus, which can remove, from a color image, the influence of an illuminant under which an object is imaged, thereby making the colors of the image substantially identical to those obtained when the object is imaged under a preferable standard illuminant, irrespective of type of the object depending upon the imaging circumstances.

According to an aspect of the present invention, there is provided a color balance adjusting apparatus comprising decorrelating means for receiving three first color component signals indicative of a color image and correlating with one another, and converting the first color component signals into three second color component signals, the correlation among the three second color component signals being reduced, the decorrelating means including a neural network with an unsupervised learning, the neural network having learned so as to minimize the correlation among the three first color component signals indicating the color image obtained under an illuminant; and conversion means for mapping the three second color component signals output from the decorrelating means, into a space of the three first color component signals, by using an inverse matrix of a transfer matrix of the neural network having learned under a preferable standard illuminant, the output of the conversion means having the same color balance as the color image obtained under the preferable standard illuminant.

According to another aspect of the present invention, there is provided a method of adjusting color balance by means of a decorrelating neural network for minimizing the correlation among a plurality of input signals and mapping means, comprising the steps of:

supplying the decorrelating neural network with three first color component signals correlating with one another and indicative of a color image obtained under an illuminant, and causing the decorrelating neural network to learn so as to output three second color component signals among which the correlation is minimized;

supplying mapping means with an inverse matrix of a transfer matrix obtained from the decorrelating neural network having learned under a preferable standard illuminant;

supplying the decorrelating neural network with three first color component signals indicative of a color image obtained under an illuminant with a color temperature; and supplying the output of the decorrelating neural network with the mapping means, the mapping means multiplying the output of the decorrelating neural network by the inverse matrix, with the result that the output of the mapping means has the same color balance as that of the color image obtained under the preferable standard illuminant.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a graph showing three main basis functions of the spectral distribution of the daylight standard illuminant D;

FIG. 5 shows the spectral sensitivity characteristics of sensors for detecting LMS values of a cone;

FIGS. 12A and 12D are is a u'-v' chromaticity diagrams, showing the input image signal of the neural network and the output image signal of a second converter, as regards the image signal of a Munsell value of 5 in the Munsell color system under the illuminant of 2850 K;

FIGS. 13A and 13 B are is a u'-v' chromaticity diagram, showing the input image signal of the neural network and the output image signal of a second converter, as regards the image signal of a Munsell value of 5 in the Munsell color system under the illuminant of 10000 K;

FIGS. 20A to 20H are shows a u'-v' chromaticity diagrams, showing the comparison between the outputs of a second converter shown in FIG. 14, as regards the image signals of a Munsell values of 2 to 9 in the Munsell color system under the illuminant of 2850 K and the standard illuminant of 6774 K; and FIGS. 21A to 21H are shows a u'-v' chromaticity diagrams, showing the comparison between the outputs of the second converter shown in FIG. 14, as regards the image signals of Munsell values of 2 to 9 in the Munsell color system under the illuminant of 10000 K and the standard illuminant of 6774 K.

DETAILED DESCRIPTION OF THE PREFERRED EMBODIMENTS

Figure 1:
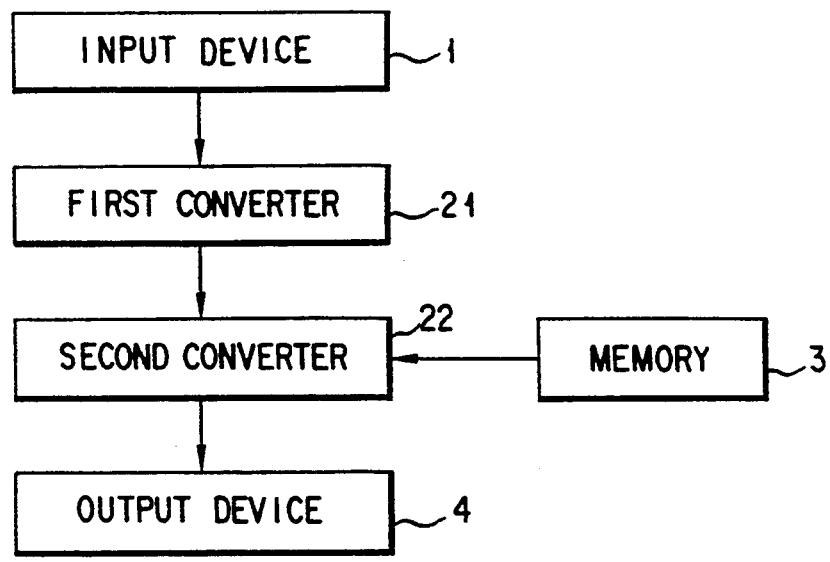
FIG. 1 is a block diagram, showing a color balance adjusting apparatus according to a first embodiment of the present invention.

A preferred embodiment of a color balance adjusting apparatus according to the present invention will now be described with reference to the accompanying drawings.

First, the principle of the present invention will be explained. In general, the primates have a chromatic adaptation function as one of its adaptation functions. The chromatic adaptation is the function of sensing colors without being affected by the circumstances, and is well known as a function closely related to the so-called color constancy in neurophysiology or psychophysics. However, the mechanism for realizing the chromatic adaptation is not clearly understood at present, and hence is one of the themes which are being studied in neurophysiology, psychophysics, etc. The color balance adjustment, especially white balance adjustment, performed in imaging devices corresponds to the color adaptation.

Further, there is a decorrelating network proposed as a model for explaining the adaptation of the nervous system of the primates, in consideration of an increase in the efficiency of signal transmission. The decorrelating network is a neural network which realizes, by using a self-organization learning rule, the processing of minimizing the correlation among several data items. However, it is not clearly understood at present to what the decorrelating network or method of minimizing the correlation is applicable, or what advantage results from the application.

The present invention has been made to actually apply the decorrelating network, proposed as a model for explaining the adaptation of nervous system of the primates, to the color adaptation, i.e., color balance adjustment, thereby to realize artificial color homeostasis.

In the color balance adjustment apparatus of the present invention, the output correlation-minimizing of the decorrelating network is utilized to remove the influence of the color temperature of the illuminant, on the basis of a predetermined data which is obtained by learning of the neural network under a standard illuminant, from input color image signals, even when the image signals are expressed by the XYZ values, RGB values, or LMS values. Accordingly, the well-balanced color image can be obtained always as if it is imaged under the preferable standard illuminant.

In addition, the function of performing gain adjusting in accordance with the range of the input image signal can be realized by modifying the feedback connection of the neural network and by adding a self-feedback connection and a bias.

Moreover, the operation of the present invention only depends upon the condition of minimizing the correlation among the input image signals, but not on a scene of the object, so that the same result can be obtained when any object is imaged.

Furthermore, since a neural network can be used to minimize the correlation among inputs, thereby effectively utilizing its learning function, the same effect can be obtained when any illuminant of any color temperature is used, and an output image in the same state can be obtained from any object imaged under any illuminating conditions.

FIG. 1 is a block diagram, showing the first embodiment of a color balance adjusting apparatus according to the present invention designed based on the above-described principle. An input device 1 such as a CCD camera outputs three color component signals correlating with one another. The three color component signals indicate, for example, XYZ values, RGB values, or LMS values.

Figure 2:
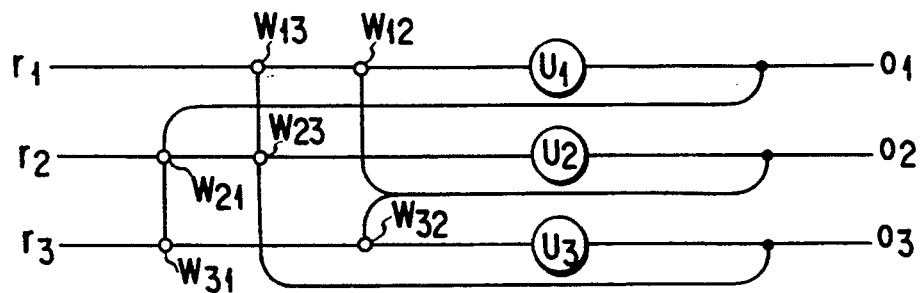
FIG. 2 shows an example of an interconnection neural network having a feedback connection and serving as a first converter employed in the first embodiment.

The three color component signals output from the input device 1 are supplied to a first converter 21. where the correlation thereamong is minimized, and a resultant signal is output. The first converter 21 is formed of a single layered neural network of an interconnection as shown in FIG. 2. This neural network has three output units U1, U2 and U3 which calculate the weighed summation of inputs from another unit, and the relationship between input and output of each unit is linear. The output units U1, U2, and U3 have a feedback connection for inhibiting the outputs of the other units. The neural network of a multi-layered may be used as the first converter 21. A learning rule of the multi-layered neural network is a supervised learning. In FIG. 2, the number of output neuron units corresponds to the number of color component signals output from the input device 1.

The output of the first converter 21 is supplied to a second converter 22, where it is converted to a signal obtained under a preferable standard illuminant, by using the inverse matrix of a transfer matrix of the neural network of the first converter 21, which has completed learning to minimize the correlation of the image component signals obtained under the preferable standard illuminant. That is, the second converter 22 converts the color temperature of the image signal. The inverse matrix of the transfer matrix of the neural network 21 for performing output-correlation minimization under the preferable standard illuminant is stored in a memory 3 which is connected to the second converter 22.

The output of the second converter 22 is supplied to an output device 4, such as a display device or video cassette recorder.

The operation of the first embodiment of the color balance adjusting apparatus having the above-described structure will be explained with reference to FIGS. 3 to 13. As is described above, the input device 1 outputs three color component signals correlating with one another. A spectral analysis as regards light indicative of an input image is performed, thereby providing the colorimetry values of the three color components correlating with one another, such as the XYZ values, RGB values, or LMS values. In this case, the the three color components may be obtained by the method disclosed in U.S. patent application No. 07/822,874. Alternatively, they may be given as follows:

$$\left.\begin{array}{l} \xi_1 = \sum_{\lambda=380}^{780} P(\lambda)\rho(\lambda)\kappa_1(\lambda) \\ \xi_2 = \sum_{\lambda=380}^{780} P(\lambda)\rho(\lambda)\kappa_2(\lambda) \\ \xi_3 = \sum_{\lambda=380}^{780} P(\lambda)\rho(\lambda)\kappa_3(\lambda) \end{array}\right\} \quad (1)$$

where $P(\lambda)$ represents a spectral distribution of an illuminant, and $\rho(\lambda)$ a spectral reflectance. Further, $\kappa_1(\lambda)$, $\kappa_2(\lambda)$, and $\kappa_3(\lambda)$ represent parameters for determining the three color components correlating with one another, and may be a color matching function, such as the XYZ values or the RGB values defined by CIE (Commission Internationale de l'Eclairage), or the LMS values obtained from the spectral sensitivity distribution of the cone of the primates (visual cell existing in the retina, for recognizing brightness and color with a photopic vision of 10 cd/m² or more).

When the three color component signals $r_i$ (i=1 to 3) are input to the first converter 21, the neural network forming the first converter 21 generates output $o_i$ by using the following equation:

$$o_i = r_i + \Sigma w_{ij} o_j \ (i \neq j) \quad (2)$$

where $w_{ij}$ represents a connection weight of a feedback connection from the j-th output to i-th input.

The equation (2) can be expressed by the following matrix equation:

$$o = r + w \cdot o \quad (3)$$

where $$o = \begin{bmatrix} o_1 \\ o_2 \\ o_3 \end{bmatrix} \quad r = \begin{bmatrix} r_1 \\ r_2 \\ r_3 \end{bmatrix} \quad w = \begin{bmatrix} 0 & w_{12} & w_{13} \\ w_{21} & 0 & w_{23} \\ w_{31} & w_{32} & 0 \end{bmatrix}$$

The stationary response of the neural network, which has completed learning, to the stationary input of the same is expressed as follows:

$$o = (I - w)^{-1} \cdot r \qquad (4)$$
$$= \phi \cdot r$$

where I represents the unit matrix, and $\phi$ the transfer matrix.

The weight of connection of the feedback connection in the neural network is modified by performing unsupervised learning in accordance with the equation each time three color component signals of each pixel of an image (Munsell color chip) obtained under the standard illuminant are input, so as to reduce the correlation among the output units U1, U2, and U3:

$$w_{ij}^{t+1} = w_{ij}^t + \Delta w_{ij}^t \qquad (5)$$

The change in the weight of connection $\Delta w_{ij}$ is expressed as follows:

$$\begin{aligned}\Delta w_{ij} &= -\alpha \cdot g(o_i) \cdot o_j \quad (i \neq j) \\ &= 0 \quad i = j \\ \text{where,} \\ g(x) &= x \quad (x \geq 0) \\ &= x \cdot d \quad (x < 0)\end{aligned} \qquad (6)$$

where $\alpha$ and d are constants.

Termination of learning is evaluated by that average value of upper triangle elements of the covariance matrix of each unit except diagonal elements thereof, which is obtained using the following equation (7). That is, learning is continued until the value $\psi$ becomes lower than a predetermined value.

$$\left.\begin{aligned}\psi &= \frac{\sqrt{\mu_{12}^2 + \mu_{23}^2 + \mu_{13}^2}}{3} \\ \text{where} \\ \mu_{ij} &= E[(o_i - \overline{o_i})(o_j - \overline{o_j})] \\ \overline{o_i} &= E[o_i]\end{aligned}\right\} \qquad (7)$$

Then, the signal converted by the first converter 21 having completed learning under an illuminant is input to the second converter 22, where it is mapped to the same color space as the image signals input to the input device 1, as is indicated as follows:

$$z = \phi_k^{-1} o \qquad (8)$$

where $\phi_k^{-1}$ represents the inverse matrix of the transfer matrix, stored in the memory 3, of the neural network having completed learning under a preferable standard illuminant.

The image signal output from the second converter 22 is converted, in the output device 4, to a desired signal such as an electrical signal or an optical signal.

In the above embodiment, a daylight standard illuminant D, which the CIE provides as a function of the color temperature with the use of definition equations described below, is used as the some examples of illuminant. It is to be noted that a standard illuminant A (the light of which corresponds to a light emitted from a black body of a correlated color temperature of approx. 2850 K and is used to display the color of the object illuminated by the incandescent lamp) is used as the illuminant having a color temperature of 4000 K or less.

Figure 3:
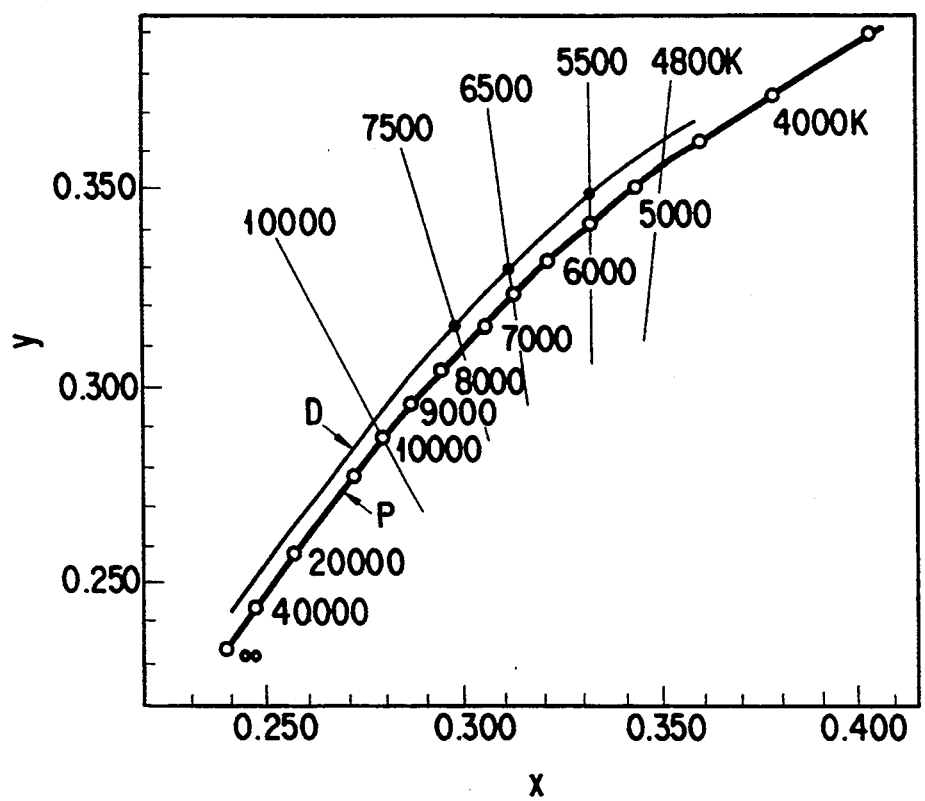
FIG. 3 is a graph, showing the relationship among a relative color temperature and chromaticity coordinates of a daylight standard illuminant D.
Figure 6A:
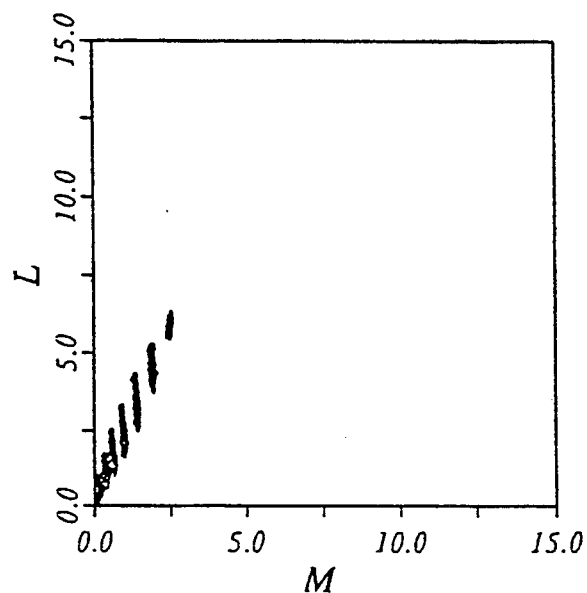
FIGS. 6A to 6C are scatter diagrams, showing the correlation among the LMS values of a color obtained under an illuminant of a color temperature of 2850 K, which are used for making the neural network shown in FIG. 2 learn.
Figures 6B, 6C:
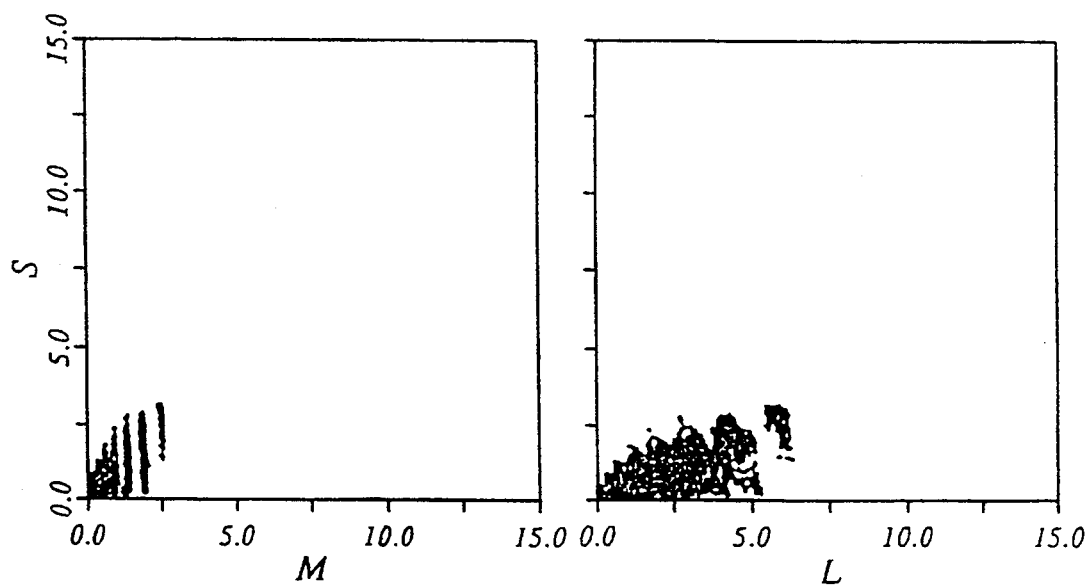
Figure 7A:
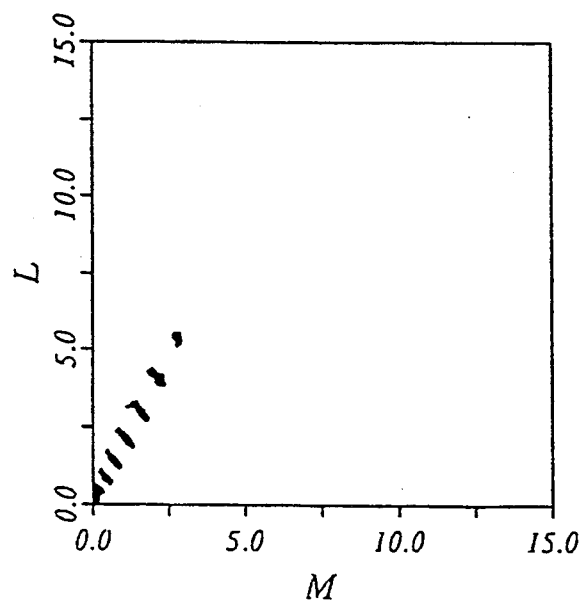
FIGS. 7A to 7C are is a scatter diagrams, showing the correlation among the LMS values of a color obtained under an illuminant of a color temperature of 6774 K, which are used for making the neural network shown in FIG. 2 learn.
Figures 7B, 7C:
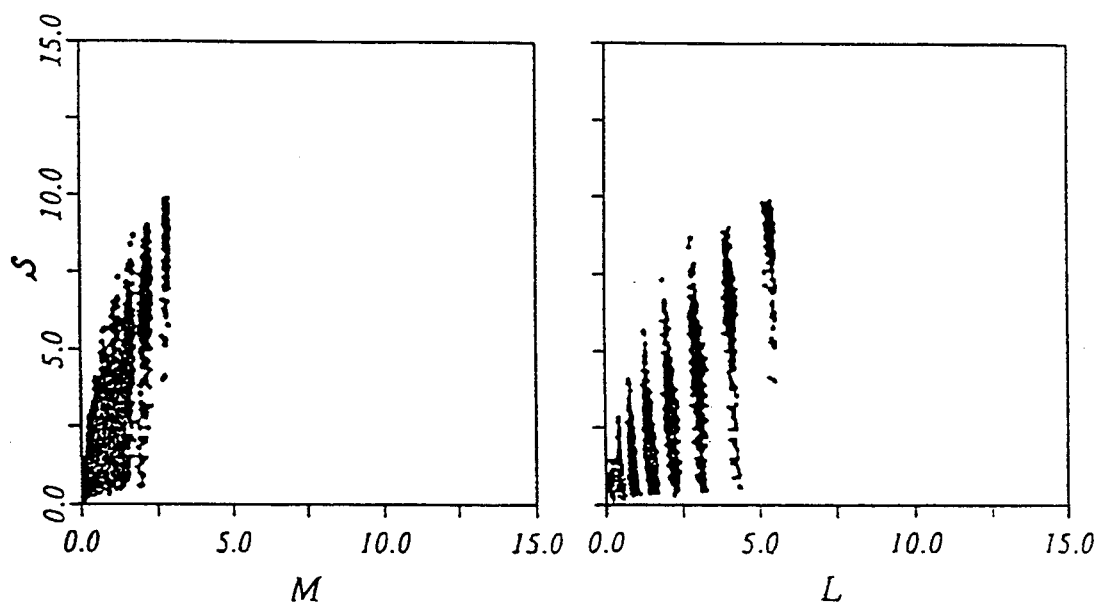
Figure 8A:
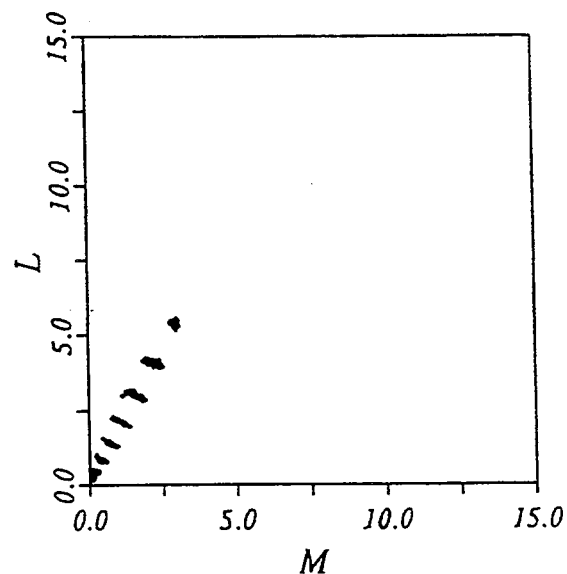
FIGS. 8A and 8C are is a scatter diagrams, showing the correlation among the LMS values of a color obtained under an illuminant of a color temperature of 10000 K, which are used for making the neural network shown in FIG. 2 learn.
Figure 8B:
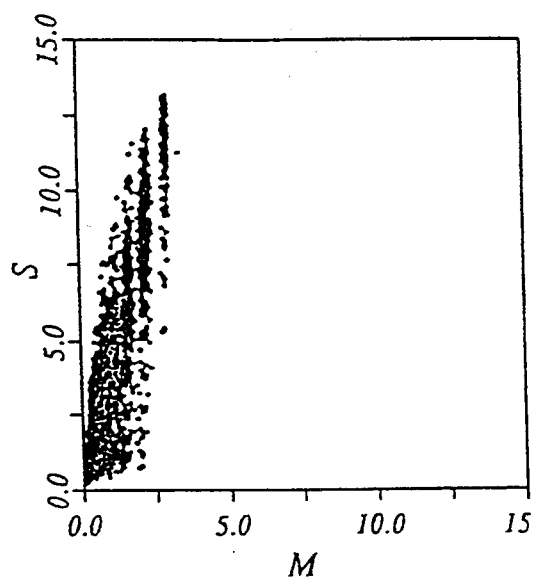
Figure 8C:
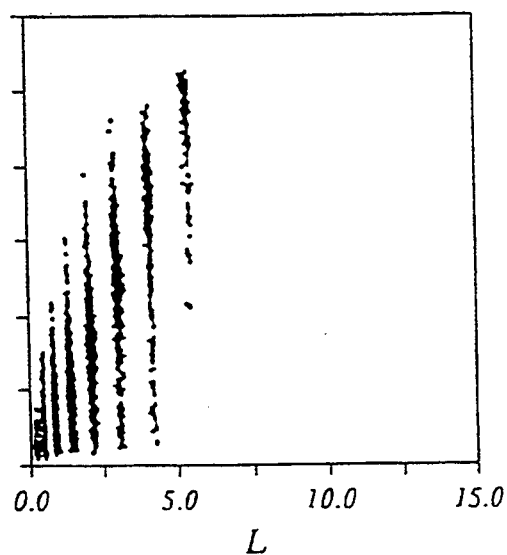
Figure 9A:
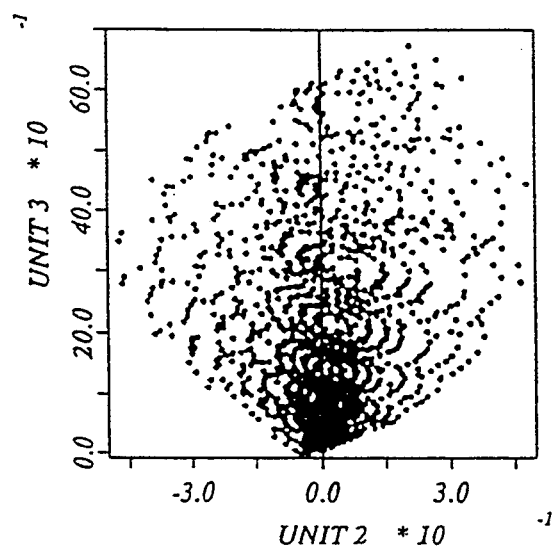
FIGS. 9A to 9C are is a scatter diagrams, showing the correlation among three outputs obtained as a result of supplying the three inputs having such correlation thereamong as shown in FIGS. 6A to 6C, respectively, to the neural network of FIG. 2 which has finished learning.
Figure 9B:
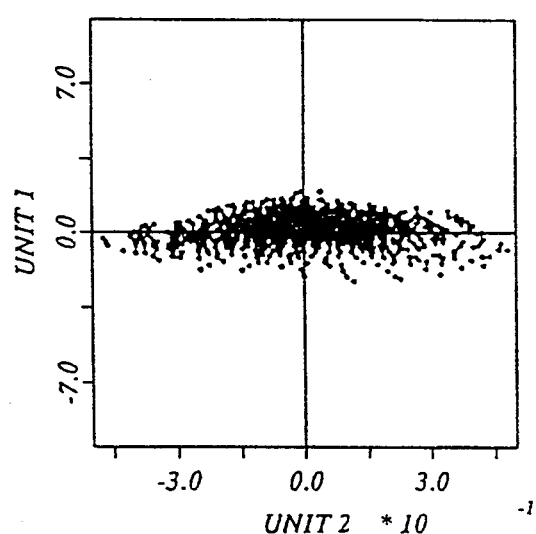
Figure 9C:
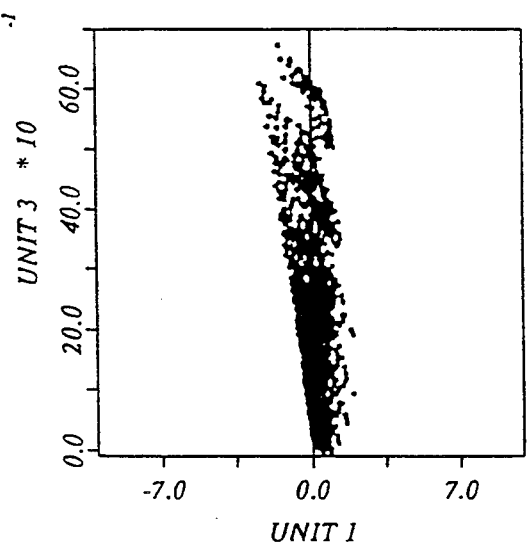
Figure 10A:
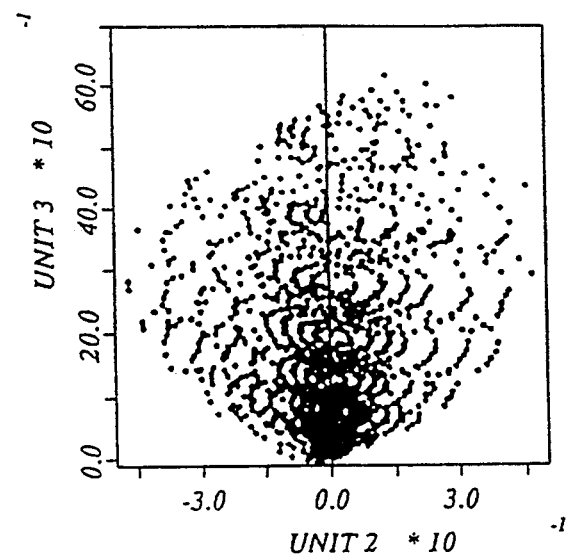
FIGS. 10A to 10C are is a scatter diagrams, showing the correlation among three outputs obtained as a result of supplying the three inputs having such correlation thereamong as shown in FIGS. 7A to 7C, respectively, to the neural network of FIG. 2 which has finished learning.
Figure 10B:
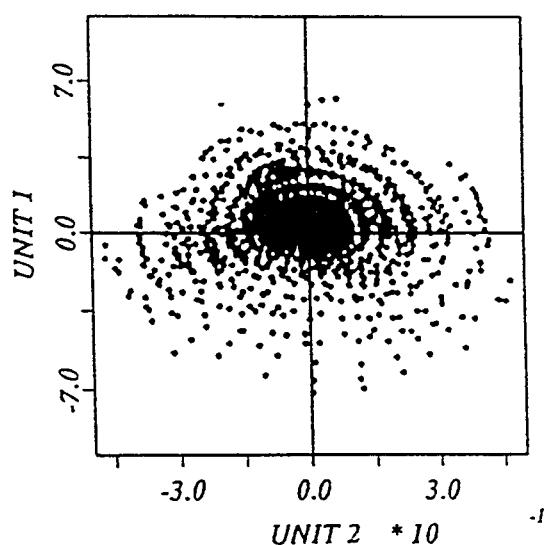
Figure 10C:
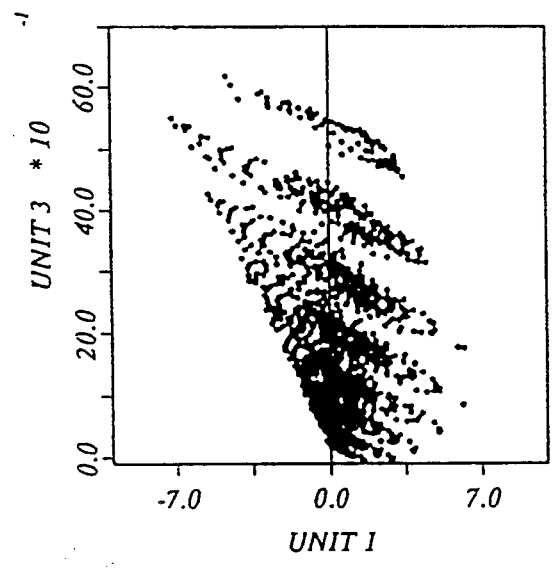
Figure 11A:
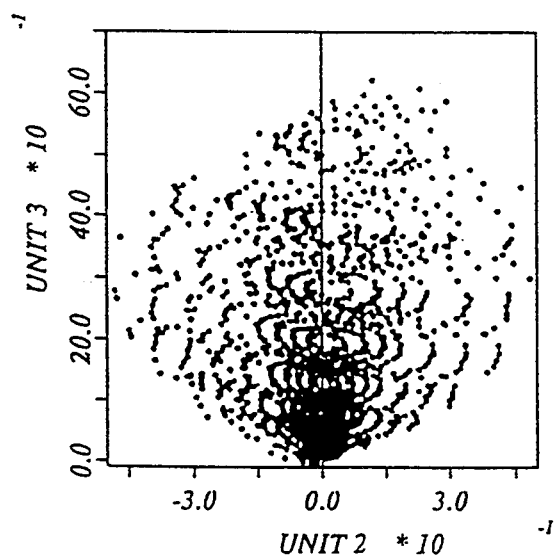
FIGS. 11A to 11C are is a scatter diagrams, showing the correlation among three outputs obtained as a result of supplying the three inputs having such correlation thereamong as shown in FIGS. 8A to 8C, respectively, to the neural network of FIG. 2 which has finished learning.
Figure 11B:
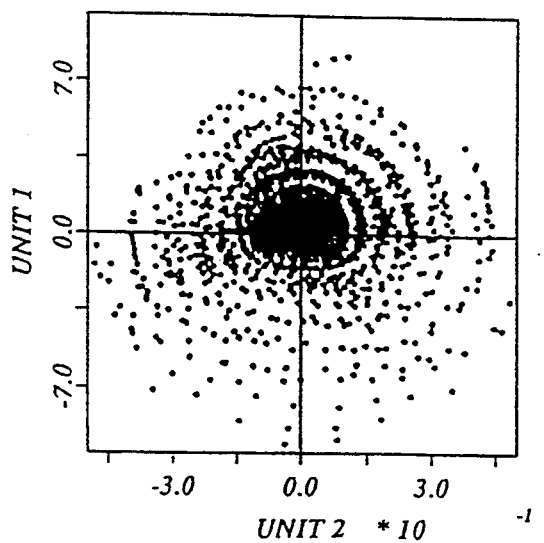
Figure 11C:
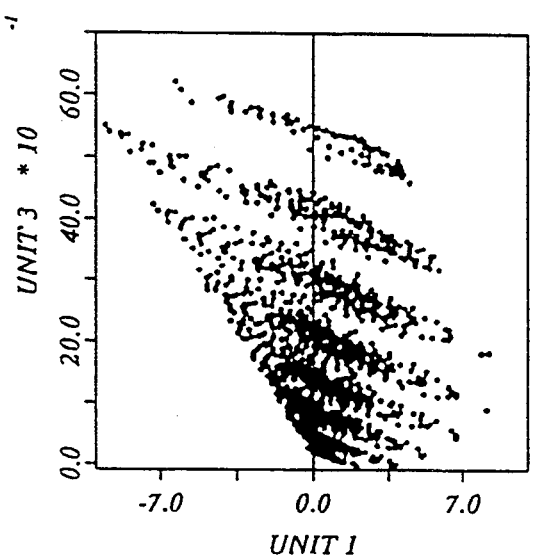

That is, in the CIE, the relationship between the correlated color temperature Te of the daylight standard illuminant D and the chromaticity coordinates ($x_D$, $y_D$) of the standard illuminant D shown in FIG. 3 is defined by the following equation, which is described in the CIE, Second Edition Publication, CIE No. 15.2 (1986), Page 9:

$$\left.\begin{aligned}T_e &= 4000 \text{ to } 7000 \\ x_D &= -4.6070 \times 10^9/T_e^3 + 2.9678 \times 10^6/T_e^2 + 0.09911 \times 10^3/T_e + 0.24403 \\ y_D &= -3.000x_D^2 + 2.870x_D - 0.275 \\ T_3 &= 7000 \text{ to } 20000 \\ x_D &= -2.0064 \times 10^9/T_e^3 + 1.9018 \times 10^6/T_e^2 + 0.24748 \times 10^3/T_e + 0.237040 \\ y_D &= -3.000x_D^2 + 2.870x_D - 0.275\end{aligned}\right\} \qquad (9)$$

The relative spectral distribution of the standard illuminant D is defined by the following equation based on the equation (9):

$$S_D(\lambda) = S_0(\lambda) + M_1 S_1(\lambda) + M_2 S_2(\lambda) \qquad (10)$$

where $M_1$ and $M_2$ are functions of the chromaticity coordinates of the standard illuminant D, and are given as follows:

$$\left.\begin{aligned}M_1 &= \frac{-1.3515 - 1.770x_D + 5.9114y_D}{0.0241 + 0.2562x_D - 0.7341y_D} \\ M_2 &= \frac{0.0300 - 31.4424x_D + 30.0717y_D}{0.0241 + 0.2562x_D - 0.7341y_D}\end{aligned}\right\} \qquad (11)$$

Further, in the equation (10), $S_0(\lambda)$, $S_1(\lambda)$ and $S_2(\lambda)$ three main basis functions of the entire spectral distribution of the daylight standard illuminant. The basis functions are shown in FIG. 4. As is evident from FIG. 4, the relative spectral distribution of the daylight standard illuminant D of 4000 to 20000 K can be obtained by determining the color temperature.

In the first embodiment, the LMS values defined by the following equations by using the spectral distributions of the daylight standard illuminant D of 6774 K and 10000 K which are obtained in the above-described manner, and the spectral distribution of the standard illuminant A which corresponds to the light emitted from a black body with a color temperature of 2850 K as defined by the CIE:

$$\left.\begin{aligned}L &= \sum_{\lambda=380}^{780} P(\lambda)\rho(\lambda)L(\lambda) \\ M &= \sum_{\lambda=380}^{780} P(\lambda)\rho(\lambda)M(\lambda) \\ S &= \sum_{\lambda=380}^{780} P(\lambda)\rho(\lambda)S(\lambda)\end{aligned}\right\} \qquad (12)$$

where $P(\lambda)$ represents a spectral distribution obtained under an illuminant, $\rho(\lambda)$ the spectral reflectance of each color chip of the sample, and $L(\lambda)$, $M(\lambda)$, and $S(\lambda)$ the spectral sensitivity characteristics of the cone as shown in FIG. 5. Further, 1596 Munsell color chips are used as the sample data, and the LMS values at the color temperatures 2850 K, 6774 K, and 10000 K are given by the equation (12).

The LMS values thus obtained at each color temperature have correlation thereamong as shown in FIGS. 6A to 8C. These correlating values are input to the first converter 21 formed of the neural network shown in FIG. 2, where learning is performed in the above-described manner so as to minimize the correlation among the LMS values, thereby modifying the weight of connection for the inhibitive feedback connection. The neural network having completed learning operates so as to minimize the correlation among input data items, and outputs a correlation-minimized signal as shown in FIGS. 9A to 11C.

The neural network is made learn under illuminants having the color temperatures of 2850 K and 10000 K, respectively, with the standard illuminant having the color temperature of 6774 K as the preferable standard illuminant. The learning is performed by supplying the LMS values at the color temperatures of 2850 K and 10000 K to the neural network. The inverse matrix of the transfer matrix of the neural network after learning is used for mapping the output signals of the neural network into the same space as the input signals to the neural network, i.e., into the L-M-S space.

The CIE's u'-v' chromaticity diagram is used so as to compare the above outputs with those obtained under the standard illuminant, thereby confirming the fact that the adjusting apparatus and method of the present invention absorb the influence of the color temperature of the illuminants and adjust the color balance to make a white color point under the two illuminants at the color temperatures of 2850 K and 10000 K to correspond to that under the single standard illuminant at the color temperature of 6774 K.

The values in the L-M-S space can be mapped into the CIE's u'-v' diagram with the use of the following equations, which are known as general equations and disclosed in the aforementioned, CIE Second Edition Publication, CIE No. 15.2 (1986), Pages 15, 16, 21 and 22, and Wyszecki. G and Styles. W. S: color science; concepts and methods, Quantitative data and formula, New York Wiley-Interscience publication (1982):

$$\begin{bmatrix} \bar{x} \\ \bar{y} \\ \bar{z} \end{bmatrix} = \begin{bmatrix} 2.9448 & -3.5010 & 0.2118 \\ 1.0000 & 1.0000 & 0.0000 \\ 0.0000 & 0.0000 & 1.0000 \end{bmatrix} \begin{bmatrix} L \\ M \\ S \end{bmatrix}$$
$$\begin{bmatrix} x \\ y \end{bmatrix} = \frac{1}{\bar{x} + \bar{y} + \bar{z}} \begin{bmatrix} \bar{x} \\ \bar{y} \end{bmatrix}$$
$$u' = \frac{4x}{-2x + 12y + 3}$$
$$v' = \frac{9y}{-2x + 12y + 3}$$
(13)

This mapping enables evaluation of results in the same coordinates irrespective of the color temperature of an illuminant since the CIE's u'-v' diagram is not affected by the color temperature.

Figures 12A, 12B:
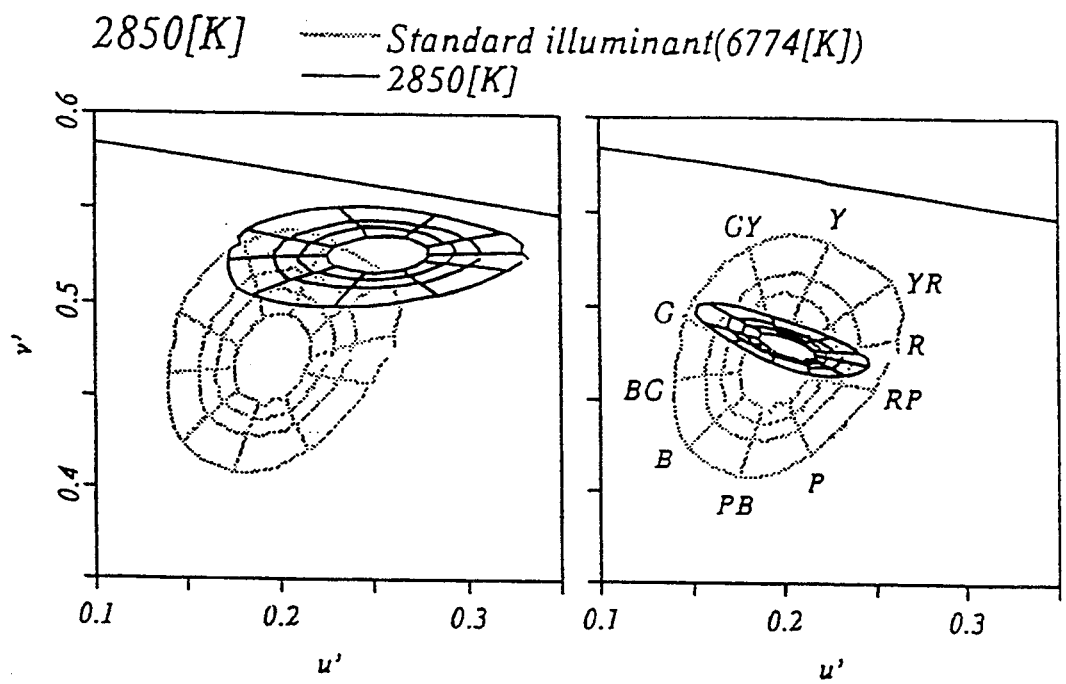
Figures 13A, 13B:
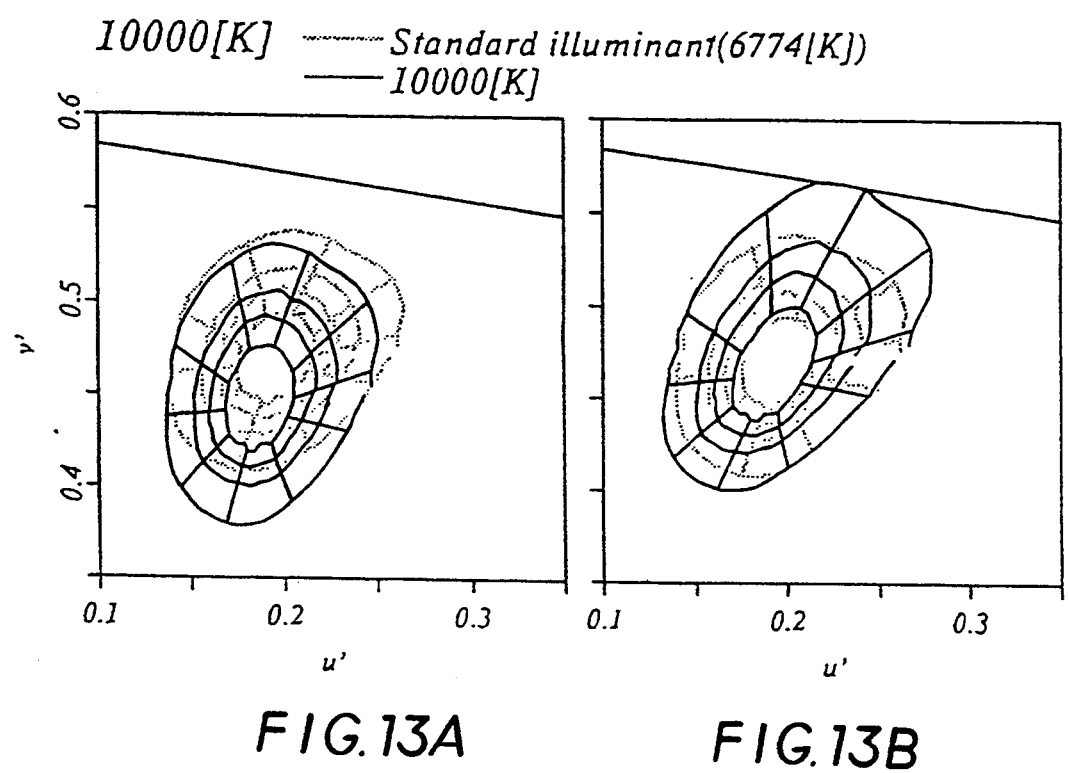

FIG. 12A and FIG. 13A are CIE's u'-v' chromaticity diagrams, showing the distributions of the input image data of the 1596 Munsell color chips which have a Munsell value of 5 and color temperatures of 2850 K and 10000 K. FIG. 12B and FIG. 13B are CIE's chromaticity diagrams, showing the distributions of the output of the second converter 22. In FIGS. 12A to 13B, identical degrees of chroma are connected to one another, and identical degrees of hue are connected to one another.

Further, distributions obtained under the standard illuminant with a color temperature of 6774 K and indicated by the broken lines, are overlapped with those obtained under the illuminants with the color temperatures of 2850 K and 10000 K and indicated by the solid lines. The linear line in an upper portion of each figure indicates a spectrum locus.

As regards the input distributions, the distribution obtained under the illuminant with 2850 K is deviated from that of the standard illuminant toward yellow, and that of the illuminant 10000 K is deviated from the same toward blue. On the other hand, as regards the output distributions, the achromatic color point (i.e., the substantially middle point) of the distribution obtained under the illuminant with 2350 K or 10000 K substantially corresponds in position to that of the distribution obtained under the standard illuminant, though the shapes of the distributions differ from each other. As is evident from this, the adjusting apparatus and method of the present invention remove the influence of the color temperature of the illuminant, and adjusts the white balance. In addition, in the case of 10000 K, the output distribution is substantially identical to that obtained under the standard illuminant in the hue direction, as well as the achromatic point, since a change in the shape of the input distribution due to the influence of the illuminant is small.

As is described above, in the white balance adjusting apparatus and method according to the present invention, learning is performed using a neural network, especially an interconnection neural network having an inhibitive feedback connection, so as to minimize, under an illuminant, the correlation among correlating color component signals such as the LMS values, RGB values, or XYZ values. Further, the output image signals of the neural network are mapped into an input signal space with the use of the inverse matrix of a transfer matrix of the neural network which is obtained as a result of the learning under the preferable standard illuminant. Thus, the influence of an illuminant at any color temperature used at the time of imaging of the object is removed, thereby performing white balance adjusting and extracting, from an image obtained under any illuminant, a color substantially identical to that obtained under the preferable standard illuminant.

Moreover, the white balance adjusting in the present invention only depends upon the function of minimizing the correlation among input data items, but not on the input image, so that it can solve the conventional problem in which quite unnatural white balance adjusting is performed, depending upon an input image. As a result, the same color temperature adjusting or white balance adjusting can be achieved irrespective of a scene of the object to be imaged.

Further, since the neural network acting as the first converter 21 can be formed of a commercial neurocomputer, no particular device is necessary, and the network can be used to perform other data processing, which means it has high generality.

As described above, according to the first embodiment, the deviation in the color balance of tile image under a given illuminant which is caused by an increase of the correlation among the color components is compensated for by decorrelating the input color components.

Figure 14:
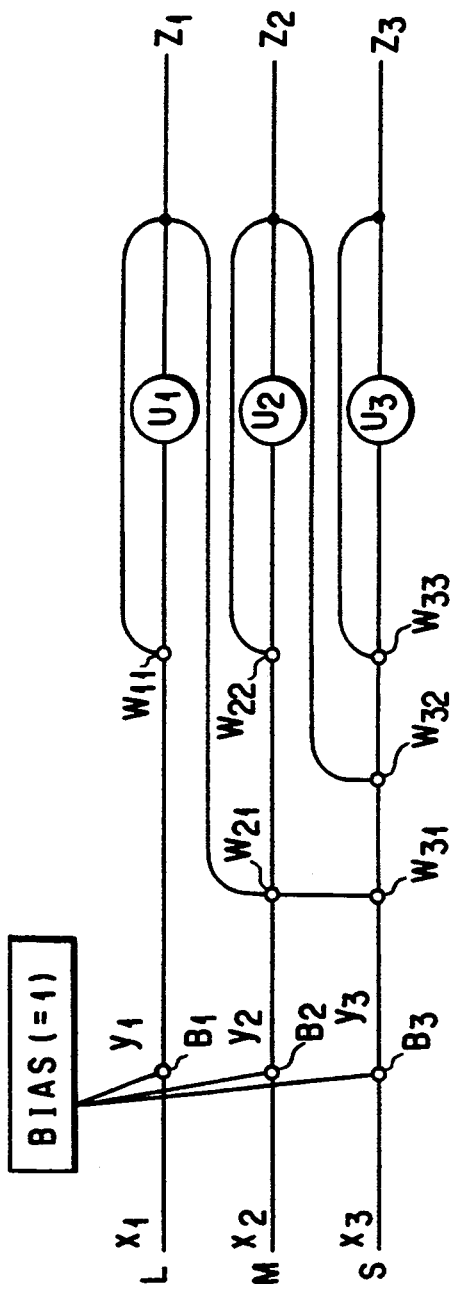
FIG. 14 shows an interconnection neural network having a self-feedback connection and a bias, which serves as a first converter in a color balance adjusting apparatus according to a second embodiment.
Figure 15A:
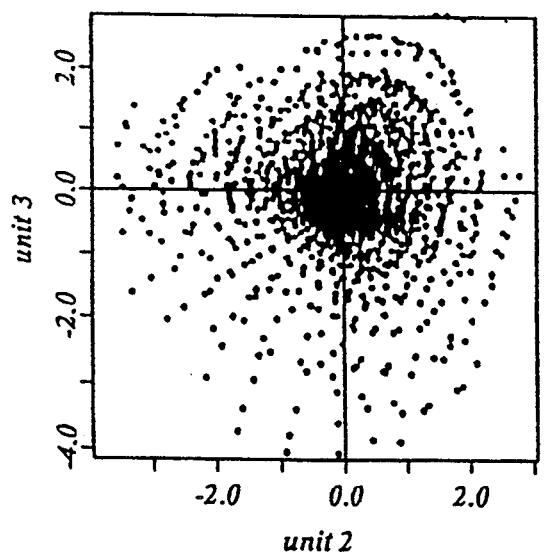
FIGS. 15A to 15C are is a scatter diagrams showing the correlation among three outputs obtained as a result of supplying the three inputs having such correlation thereamong as shown in FIGS. 6A–6C, respectively, to the neural network of FIG. 14 which has finished learning.
Figure 15B:
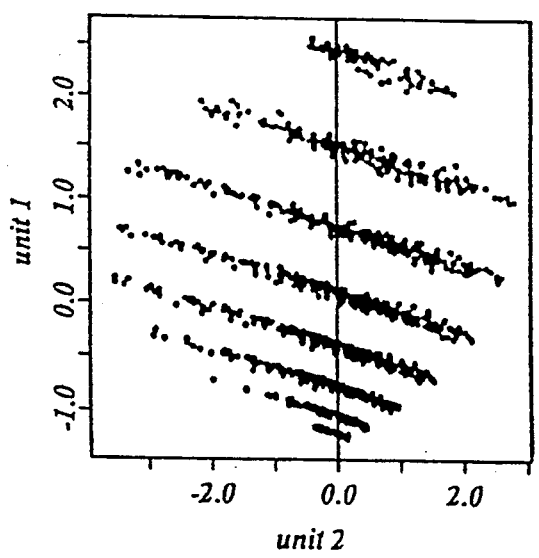
Figure 15C:
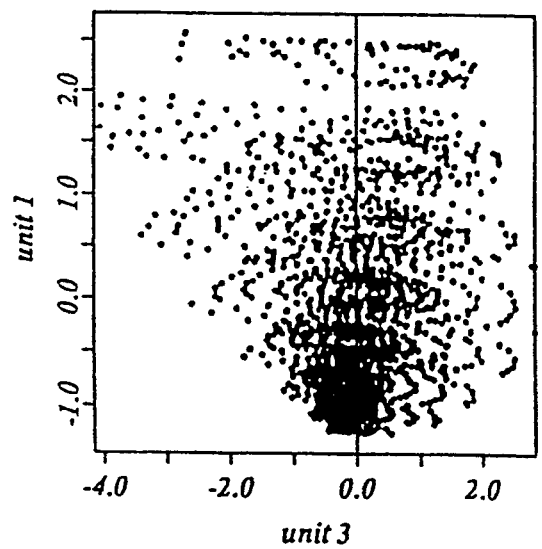
Figure 16A:
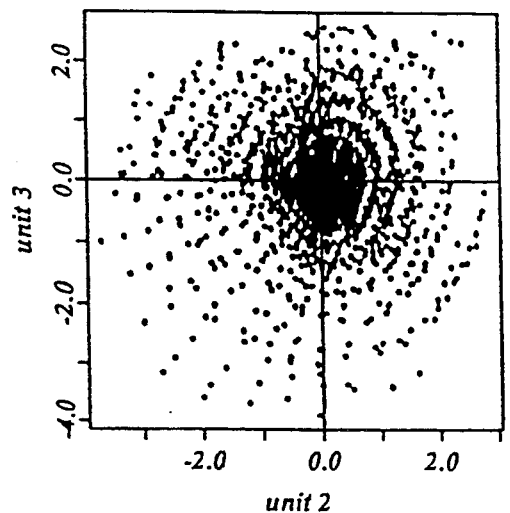
FIGS. 16A to 16C are scatter diagrams showing the correlation among three outputs obtained as a result of supplying the three inputs having such correlation thereamong as shown in FIGS. 7A to 7C, respectively, to the neural network of FIG. 14 which has finished learning.
Figure 16B:
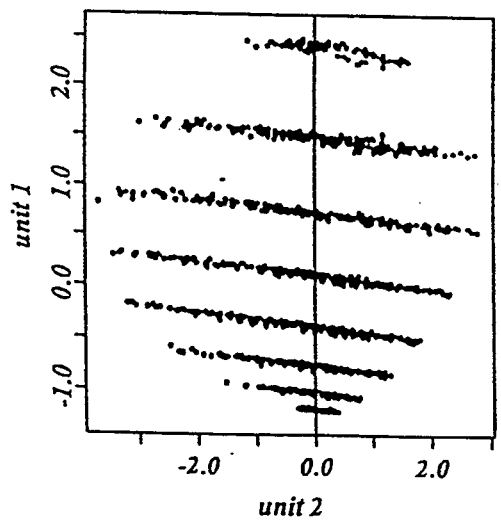
Figure 16C:
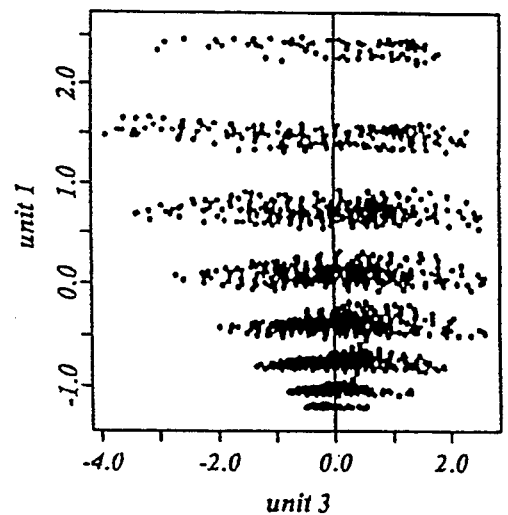
Figure 17A:
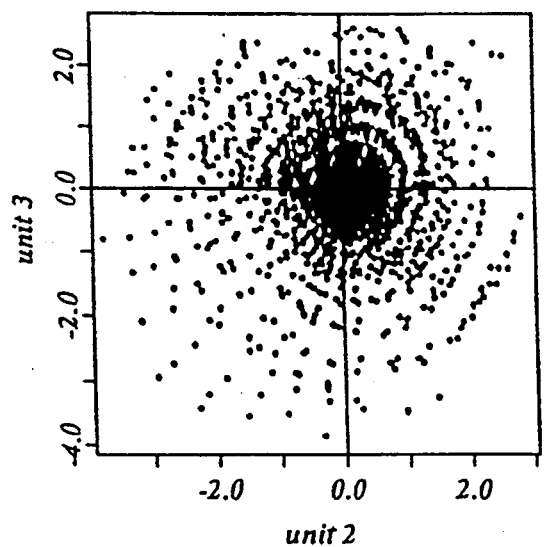
FIGS. 17A to 17C are scatter diagrams, showing the correlation among three outputs obtained as a result of supplying the three inputs having such correlation thereamong as shown in FIGS. 8A to 8C, respectively, to the neural network of FIG. 14 which has finished learning.
Figure 17B:
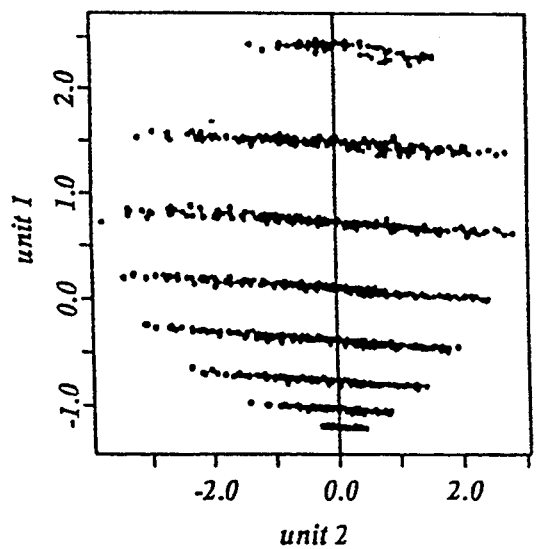
Figure 17C:
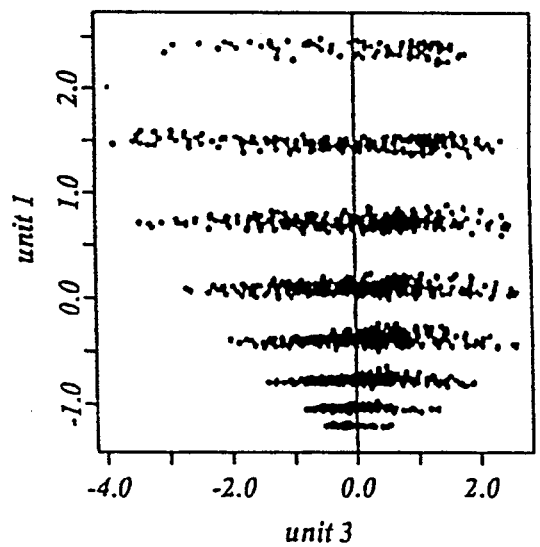
Figures 18A, 18B:
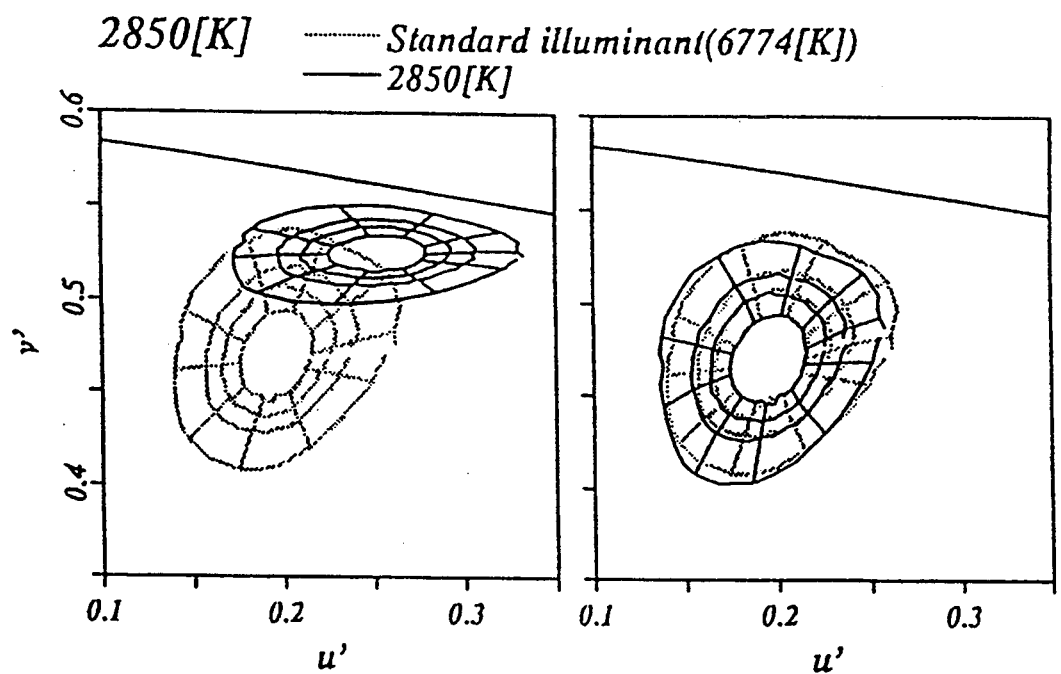
FIGS. 18A to 18B are u'-v' chromaticity diagrams, showing the input image signal of the neural network and the output image signal of a second converter, as regards the image signal of a Munsell value of 5 in the Munsell color system under the illuminant of 2850 K.
Figures 19A, 19B:
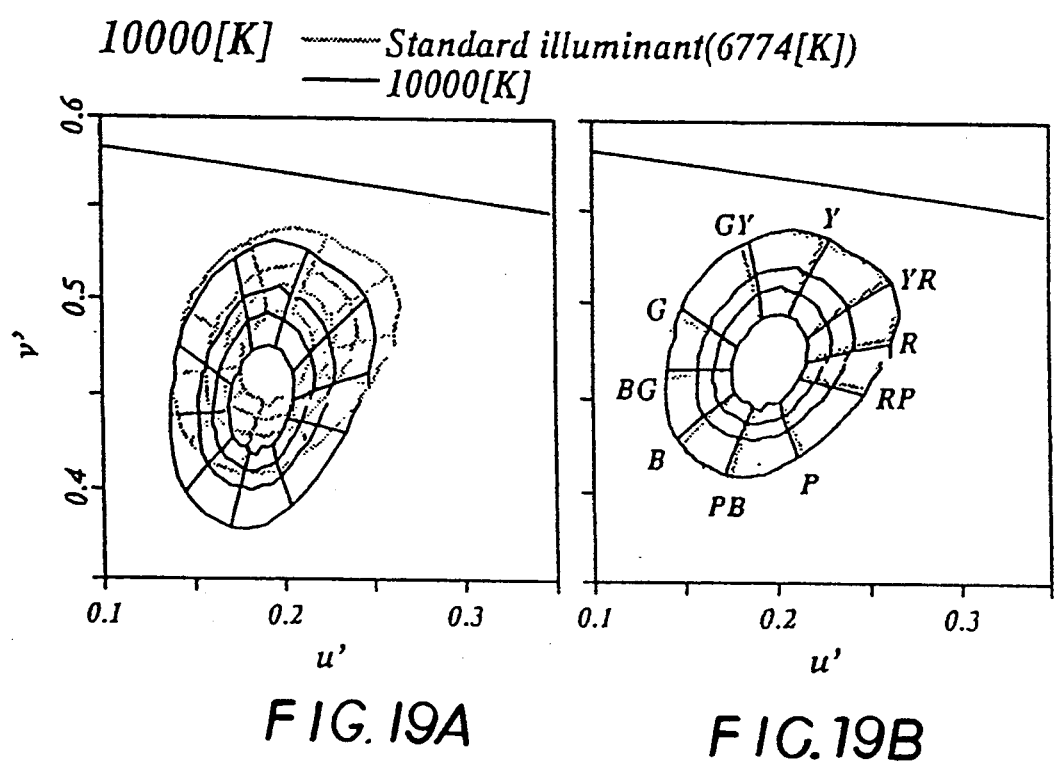
FIGS. 19A and 19B are u'-v' chromaticity diagrams, showing the input image signal of the neural network and the output image signal of a second converter, as regards the image signal of a Munsell value of 5 in the Munsell color system under the illuminant of 10000 K.

Though in the first embodiment, the neural network acting as the first converter 21 is formed of a neural network having a feedback connection as shown in FIG. 2, it may be formed of a neural network having a self-feedback connection and a bias connection as shown in FIG. 14. In this case, bias adjustment and gain adjustment can automatically be performed in accordance with the range of the input distribution, thereby performing more accurate white balance-adjustment than in the first embodiment.

The learning rules as regards a weight of bias connection and a weight of connection in the neural network shown in FIG. 14 are expressed by the following equations, respectively:

$$\left.\begin{array}{l} y_i = x_i + B_i \\ \text{where} \\ \Delta B_i = -\alpha y_i \\ B_i^{t+1} = B_i^t + \Delta B_i^t \\ B_i^t = 0 \end{array}\right\} \quad (14)$$

$$\left.\begin{array}{l} w_{ij}^{t+1} = w_{ij}^t + \Delta w_{ij}^t \\ \text{where} \\ \Delta w_{ij} = \dfrac{\alpha}{1 - w_{ij}} z_i z_j \quad (i > j) \\ \phantom{\Delta w_{ij}} = \dfrac{\alpha}{1 - w_{ij}} (z_i^2 - K) \quad (i = j) \end{array}\right\} \quad (15)$$

Further, the output of each unit in the network is given as follows:

$$z_i = y_i + \sum_{i \geq j} w_{ij} z_j \quad (16)$$

Like the equation (3) in the first embodiment, the equation (16) can be expressed in a matrix form as follows:

$$z = (I - w)^{-1} y \quad (17)$$

$$z = \begin{bmatrix} z_1 \\ z_2 \\ z_3 \end{bmatrix} \quad y = \begin{bmatrix} y_1 \\ y_2 \\ y_3 \end{bmatrix} \quad w = \begin{bmatrix} w_{11} & 0 & 0 \\ w_{21} & w_{22} & 0 \\ w_{31} & w_{32} & w_{33} \end{bmatrix}$$

As in the first embodiment, an evaluation equation for learning is given by the equation (7).

The LMS values in the Munsell color system are used as input data items, which are obtained using illuminants at color temperatures of 2850 K, 6774 K, and 10000 K in the same manner as in the first embodiment. An illuminant at a color temperature of 6774 K is used as the preferable standard illuminant. The LMS values in the Munsell color system corresponding to the illuminants at of 2850 K, 6774 K, and 10000 K are shown in FIGS. 6A to 8C.

Color component signals correlating with one another as shown in FIGS. 6A to 8C are input to a neural network as shown in FIG. 14, learning for minimizing the correlation among the color components is performed with the use of the learning equations (14) and (15), thereby correcting the weight of connection and the bias. Thereafter, the network having completed learning operates to minimize the correlation among color components, and outputs correlation-minimized values as shown in FIGS. 15A to 17C.

Then, the improvement in accuracy of the above neural network due to the gain and bias adjustments will be evaluated using those data items with a Munsell value of 5 in the Munsell color system, which are used as the input data items in FIGS. 12A and 13B. This evaluation is made to indicate that the neural network of the second embodiment can perform more accurate color temperature adjustment and white balance adjustment than that of the first embodiment, with the result that good white point adjustment is performed, and also that the chroma and hue components have the same values as those obtained under the preferable standard illuminant.

Like FIG. 12A and FIG. 13A, FIG. 18A and FIG. 19A are CIE's u'-v' chromaticity diagrams, showing the distributions of the input image data the Munsell color chips which have a Munsell value of 5 and color temperatures of 2850 K and 10000 K. Similarly, like FIG. 12B and FIG. 13B, FIG. 18B and FIG. 19B are CIE's chromaticity diagrams, showing the distributions of the output of the second converter 22.

As is evident from FIGS. 18A to 19B the neural network of the structure shown in FIG. 14 can perform much more accurate adjustment than the network shown in FIG. 2. In particular, in the case of the color temperature 2850 K of FIGS. 18A and 18B, the accuracy not only in the position of the white point but also in the shape of the distribution is much higher than in the case of the first embodiment (FIGS. 12A and 12B). This means that the neural network of the second embodiment can extract colors in a stable manner. The degradation of the shape of the output distribution is caused if the range of the input distribution exceeds a predetermined range of the neural network. According to the second embodiment, the range of the input distribution is adjusted so that the range of the input distribution never exceeds the predetermined range of the neural network.

This is evident also from FIGS. 20A to 21H. FIGS. 20A to 20H are u'-v' chromaticity diagrams, showing the comparison among the outputs of the neural network shown in FIG. 14, as regards the image signals of a Munsell values of 2 to 9 in the Munsell color system under the illuminant of 2850 K and the preferable standard illuminant of 6774 K, and FIGS. 21A to 21H are u'-v' chromaticity diagrams, showing the comparison among the outputs of the neural network shown in FIG. 14, as regards the image signals of a Munsell values of 2 to 9 in the Munsell color system under the illuminant of 10000 K and the preferable standard illuminant of 6774 K.

In the color temperature- or white balance adjusting method and apparatus according to the second embodiment, it is a matter of course to provide the same effect as can be obtained from the first embodiment. In addition to this, bias adjustment and gain adjustment can automatically be performed in accordance with the range of an input distribution, since the employed neural network has a self-feedback connection and a bias.

As is described above, the white balance adjusting apparatus according to the present invention comprises decorrelating means for converting three first color component signals indicative of a color image and correlating with one another, into three second color component signals, the correlation among the second color component signals being minimized, the decorrelating means formed of a neural network having a learning function, the neural network having learned so as to minimize the correlation among the first color component signals indicating the color image obtained under an illuminant; and conversion means for mapping the second color component signals output from the decorrelating means, into a signal space of the first color component signals, with the use of the inverse matrix of a transfer matrix of the neural network having learned. Therefore, the present invention can provide a very reliable color temperature- or white balance adjusting method and apparatus, which can remove, from an input color image, the influence of a color temperature of an illuminant under which the object is imaged, thereby always making the colors of the image substantially identical to those obtained under a preferable standard illuminant whatever the image is.

Further, by effectively utilizing the function of the decorrelating network, influence of a color temperature of an illuminant under which a color image has been obtained can be removed from the image on the basis of the inverse matrix of a transfer matrix of the neural network having learned, even if the image is expressed by any of the LMS values, RGB values, or XYZ values, thereby extracting a color identical to that obtained under a preferable standard illuminant.

Moreover, by using a neural network having a self-feedback connection and a bias as the decorrelating means, automatic bias adjustment and gain adjustment can be performed in accordance with the range of the input distribution.

Furthermore, since the adjusting operation depends only upon the condition of minimizing the correlation among input data items, but not on a scene of the object to be imaged, the same effect can always be obtained, whatever the image is.

In addition to the above, since the neural network is used to minimize the correlation among outputs, and its learning ability can effectively be used, the same effect can be obtained under any illuminant, i.e., an output image of the same level can be obtained, whatever the illuminant and/or object is.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, though the embodiments are directed to white balance adjustment, the color balance can be adjusted so that any desired color may be viewed as if it is imaged under a standard illuminant, even when the color temperature varies. Further, the neural network is not limited to the above, but may be a multi-layered network.

What is claimed is:

1. A color balance adjusting apparatus comprising:
    decorrelating means for receiving first color component signals which indicate a color image obtained under an illuminant and which are correlated with one another and converting the first color component signals into second color component signals of reduced correlation, the decorrelating means comprising a neural network which is formed of neuron units having feedback connections and being learned so as to reduce the correlation among the first color component signals; and
    conversion means for converting the second color component signal output from the decorrelating means into signals indicating a color image having the same color balance as a color image obtained under a standard illuminant, said conversion means utilizing an inverse matrix of a transfer matrix of the neural network having been learned under the standard illuminant.

2. The apparatus according to claim 1, wherein each of said neuron units calculates a weighted summation of the first color component signals and inputs from another neuron unit through the feedback connections.

3. The apparatus according to claim 1, wherein each of said neuron units has a bias and a self-feedback connection, and calculates a weighted summation of the first color component signals and inputs from another neuron unit through the feedback connections.

4. The apparatus according to claim 1, wherein said neural network performs unsupervised learning.

5. The apparatus according to claim 1, wherein said decorrelating means receives XYZ values defined by CIE as the first color component signals.

6. The apparatus according to claim 1, wherein said decorrelating means receives RGB values defined by CIE as the first color component signals.

7. The apparatus according to claim 1, wherein said decorrelating means receives LMS values indicative of spectral sensitivity characteristics of the cone-shaped cells of the primate eye as the first color component signals.

8. The apparatus according to claim 1, wherein learning has been performed in said decorrelating means to reduce the correlation among the first color component signals indicating the color image obtained under any illuminant.

9. The apparatus according to claim 1, wherein said conversion means has a memory for storing the inverse matrix, and means for multiplying the contents of said memory by the output of said decorrelating means.

10. A method of adjusting color balance by means of a decorrelating neural network for reducing the correlation among input signals and converting means, comprising the steps of:
    supplying the decorrelating neural network with first color component signals which are correlated with one another and which indicate a color image obtained under a standard illuminant, and causing the decorrelating neural network to learn so as to reduce the correlation of the first color component signals;
    storing an inverse matrix of a transfer matrix of the decorrelating neural network having been learned;
    supplying the decorrelating neural network with second color component signals which are correlated with one another and which indicate a color image obtained under a given illuminant with a given color temperature, and causing the decorrelating neural network to learn so as to reduce the correlation of the second color component signals;
    supplying the output of the decorrelating neural network supplied with the second color component signals and the stored inverse matrix with the converting means, and multiplying the output of the decorrelating neural network by the inverse matrix, with the result that the output of the converting means indicates an image having the same color balance as that of the color image obtained under a standard illuminant.

11. The method according to claim 10, wherein said neural network has neuron units with feedback connections which calculate a weighted summation of the first color component signals and inputs from another neuron unit through the feedback connections.

12. The method according to claim 10, wherein said neural network has neuron units with biases and self-feedback connections, which calculate a weighted summation of the first color component signals and inputs from another neuron unit through the feedback connections.

13. The method according to claim 10, wherein said neural network performs unsupervised learning.

14. The method according to claim 10, wherein said first color component signals are XYZ values defined by CIE.

15. The method according to claim 10, wherein said first color component signals are RGB values defined by CIE.

16. The method according to claim 10, wherein said first color component signals are LMS values indicative of spectral sensitivity characteristics of the cone-shaped cells of the primate eye.

17. The method according to claim 10, wherein said preferable standard illuminant is an illuminant with a color temperature of 5000 to 7500 K.

18. The method according to claim 10, wherein said standard illuminant is a daylight standard illuminant defined by CIE.

* * * * *